UNITED STATES PATENT OFFICE.

DAVID MARCUS, OF LONDON, ENGLAND.

COMPOSITION FOR DRESSING LEATHER.

SPECIFICATION forming part of Letters Patent No. 602,762, dated April 19, 1898.

Application filed August 30, 1897. Serial No. 650,055. (Specimens.) Patented in England June 27, 1896, No. 14,267.

*To all whom it may concern:*

Be it known that I, DAVID MARCUS, merchant, a subject of the Queen of Great Britain and Ireland, residing at 149 Fenchurch street, in the city of London, England, have invented certain Improvements in Compositions for Dressing Leather or other Flexible Materials, (for which I have obtained a patent in Great Britain, No. 14,267, dated June 27, 1896,) of which the following is a specification.

The invention has for its object to provide means by which the sap or juice of the *Rhus vernicifera* (a plant or tree which grows in Japan, China, and India) is rendered sufficiently pliant, adhesive, elastic, and brilliant to make it suitable for application to leather and other flexible materials, the essential part of the process consisting in the admixture therewith of an elastic gum—such as gutta-percha, or india-rubber, or sulfur and india-rubber, or sulfur and gutta-percha.

Pure gutta-percha or pure india-rubber may be first rendered into what is generally known in the india-rubber trade as "solid" or "vulcanized" india-rubber or gutta-percha by the admixture of sulfur in a percentage varying from about two and a half to ten per cent., according to the degree of toughness desired. It may be further toughened by mixing therewith a small quantity of silicate of magnesia. In cases where a material of great elasticity is required pure india-rubber only may be used, or if a commoner quality be required pure gutta-percha only may be used. The india-rubber or gutta-percha so prepared or mixture thereof with sulfur or with sulfur and silicate of magnesia ought to be thoroughly warmed and mixed in a vessel subjected to heat preferably applied by means of a steam-jacket. The temperature employed for this first reduction of the rubber is preferably from 235° to 260° Fahrenheit. The inside lining of the vessel should be first coated with an oil, such as linseed-oil, so as to prevent contact between the contents and the inner lining of the vessel. When the mixture is reduced to a thick semifluid condition, it should be allowed partially to cool, preferably to a temperature of, say, about 120° Fahrenheit, and then the sap or juice of the *Rhus vernicifera*, preferably at a temperature of, say, about 70° Fahrenheit, should be poured into the vessel, the amount of the sap or juice varying from twice to twenty times the amount of the other contents of the vessel, according to the strength and density of the material required to be produced. The sap or juice will be gradually absorbed or taken up by the sulfur and gutta-percha or india-rubber mixture or by the pure gutta-percha or india-rubber, as the case may be, and when it has thoroughly assimilated or eaten its way into the mixture a varnish is produced ready for use, and which can be applied with a wooden or steel spatula or with a brush on clean smooth prepared leather or the other flexible material to which it is to be applied. The drying of the leather or other flexible material so covered can be best effected in a damp room, which quickly hardens the sap or juice of the *Rhus vernicifera* contained in the mixture.

Colors for the varnish may be obtained by adding coloring pigments, such as red oxid of iron (iron rust) for red brown, vermilion for red, Prussian-blue and orpiment for green, rose pink (chalk dyed with a decoction of Brazil wood and alum) for purple, and the like.

One coating or two or more coatings may be applied, according to the degree of brightness and depth of hue required; but it is advisable that between each coat the surface should be slightly roughened in order to make each coat adhere firmly.

Having now particularly described and ascertained the nature of this invention and in what manner the same is to be performed, I declare that what I claim is—

1. A composition for dressing leather, or other flexible material, the said composition being made by mixing an elastic gum with the sap, or juice, of the *Rhus vernicifera*.

2. A composition for dressing leather, or other flexible material, the said composition being made by mixing india-rubber with the sap, or juice, of the *Rhus vernicifera*.

3. A composition for dressing leather or other flexible material, the said composition being made by mixing sulfur and elastic gum with the sap or juice of the *Rhus vernicifera*.

4. A composition for dressing leather or other flexible material, the said composition being made by mixing an elastic gum and silicate of magnesia with the sap or juice of the *Rhus vernicifera*.

In testimony whereof I have signed my name to this specification in the presence of two subscribing witnesses.

DAVID MARCUS.

Witnesses:
 FRAS. A. CORRIL,
 W. S. NICOLL.